(12) United States Patent
Adam et al.

(10) Patent No.: US 12,538,915 B2
(45) Date of Patent: Feb. 3, 2026

(54) IMAGE MONITORING FOR CONTROL OF INVASIVE GRASSES

(71) Applicant: Discovery Purchaser Corporation, Wilmington, DE (US)

(72) Inventors: Kevin Adam, Cary, NC (US); Brent Slone, Cary, NC (US)

(73) Assignee: Discovery Purchaser Corporation, Wilmington, DE (US)

( * ) Notice: Subject to any disclaimer, the term of this patent is extended or adjusted under 35 U.S.C. 154(b) by 461 days.

(21) Appl. No.: 17/919,228

(22) PCT Filed: Apr. 14, 2021

(86) PCT No.: PCT/US2021/027299
§ 371 (c)(1),
(2) Date: Oct. 14, 2022

(87) PCT Pub. No.: WO2021/211718
PCT Pub. Date: Oct. 21, 2021

(65) Prior Publication Data
US 2023/0165235 A1 Jun. 1, 2023

Related U.S. Application Data

(60) Provisional application No. 63/011,955, filed on Apr. 17, 2020.

(51) Int. Cl.
A01M 7/00 (2006.01)
A01B 79/00 (2006.01)
(Continued)

(52) U.S. Cl.
CPC ......... A01M 7/0089 (2013.01); A01B 79/005 (2013.01); A01M 21/043 (2013.01); A01N 25/00 (2013.01)

(58) Field of Classification Search
CPC .... A01M 7/0089; A01M 21/00; A01M 21/02; A01M 21/04; A01M 7/0042; A01M 7/00;
(Continued)

(56) References Cited

U.S. PATENT DOCUMENTS 8,855,937 B2 * 10/2014 Lindores ................ G06Q 10/06
703/11
9,058,633 B2 * 6/2015 Lindores ................ G06Q 50/02
(Continued)

FOREIGN PATENT DOCUMENTS

| WO | WO2018/142371 | 8/2018 |
| WO | WO2019/081375 | 5/2019 |
| WO | WO2019/226869 | 11/2019 |

OTHER PUBLICATIONS

Peña JM, Torres-Sánchez J, de Castro AI, Kelly M, López-Granados F (2013) Weed Mapping in Early-Season Maize Fields Using Object-Based Analysis of Unmanned Aerial Vehicle (UAV) Images. PLOS ONE 8(10): e77151. https://doi.org/10.1371/journal.pone.0077151 (Year: 2013).*

(Continued)

Primary Examiner — Courtney Joan Nelson
(74) Attorney, Agent, or Firm — E. Eric Mills; Nicholas P. Stadnyk; Maynard Nexsen PC

(57) ABSTRACT

The invention relates to weed mapping, monitoring and control, in particular to the mapping, monitoring and control of invasive annual grasses. A computer system comprises a receiving unit providing a processing unit with images of a geographical area, the images displaying the geographical area at points in time during a phenological cycle of a weed. At least two images depicting a weed at two different phenological stages may be used because two sequentially collected images are required in order to identify a characteristic temporal change. The processing unit analyzes the images to identify image areas showing a spectral signature (Continued)

Figure 1:
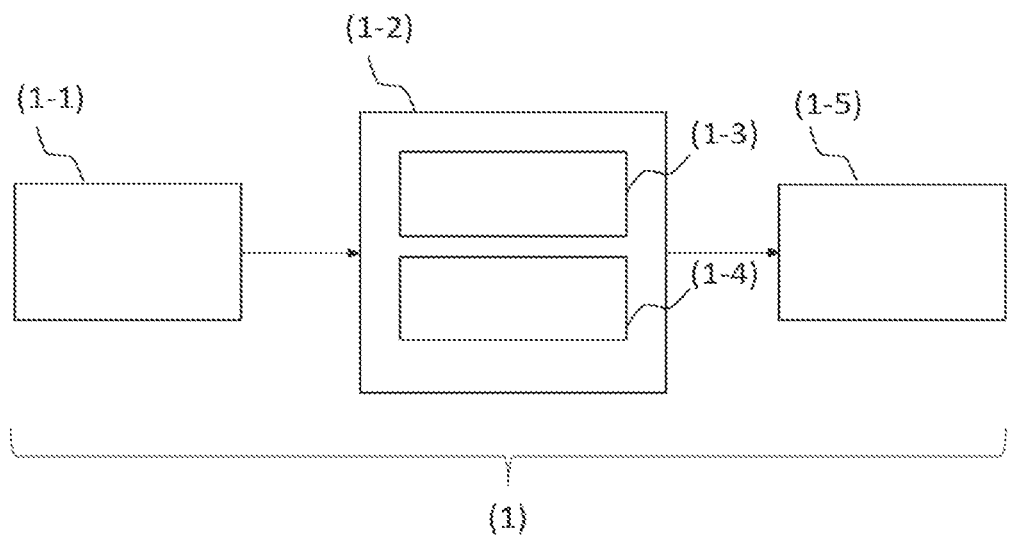

characteristic of the weed. The processing unit identifies geographical sub-areas corresponding to the identified image areas and to create a weed distribution map with the identified geographical sub-areas marked as areas affected by the weed. The output unit is configured to output the map.

15 Claims, 4 Drawing Sheets

(51) Int. Cl.
*A01M 21/04* (2006.01)
*A01N 25/00* (2006.01)

(58) Field of Classification Search
CPC ..... A01M 21/043; G06V 10/82; G06V 20/56; G06V 20/188; G06V 20/10; G06V 10/764; G06V 10/56; G06V 20/38; G06V 20/17; G06V 20/70; G06V 10/58; G06V 10/751; G06V 20/68; G06V 20/13; G06V 10/87; G06V 30/2528; G06V 10/26; G06V 10/25; A01B 39/18; A01B 79/02; A01B 79/005; G06T 2207/30188; G06T 2207/20084; G06T 2207/20081; G06T 7/11; G06T 7/0004; G06T 2207/10024; G06T 2207/10032; G06T 2207/30128; G06T 9/002; G06N 20/00; G06N 3/08; G06N 3/045; A01C 23/047; A01G 7/06; A01G 22/00; G01N 2021/8466; G01N 33/0098; A01N 25/00
See application file for complete search history.

(56) References Cited

U.S. PATENT DOCUMENTS

| | | | |
|---|---|---|---|
| 11,304,355 B2 * | 4/2022 | Noivirt-Brik | G06F 18/241 |
| 11,373,288 B2 * | 6/2022 | Peters | G06Q 10/04 |
| 2018/0336460 A1 * | 11/2018 | Tschemezki | G06N 3/045 |
| 2019/0174740 A1 * | 6/2019 | Lambert | A01D 43/063 |

OTHER PUBLICATIONS

I. Sa et al., "weedNet: Dense Semantic Weed Classification Using Multispectral Images and MAV for Smart Farming," in IEEE Robotics and Automation Letters, vol. 3, No. 1, pp. 588-595, Jan. 2018, doi: 10.1109/LRA.2017.2774979. (Year: 2018).*
Malmstrom CM, Butterfield HS, Planck L, Long CW, Eviner VT (2017) Novel fine-scale aerial mapping approach quantifies grassland weed cover dynamics and response to management. PLOS ONE 12(10): e0181665. https://doi.org/10.1371/journal.pone.0181665 (Year: 2017).*
Sa, Inkyu et al., "weedNet: Dense Semantic Weed Classification Using Multispectral Images and MAV for Smart Farming" IEE Robotics and Automation Letters, vol. 3, No. 1, Jan. 1, 2018. (8 pages).
Ghedass, F. et al., "An improved classification of hyperspectral imaging based on spectral signature and Gray Level Co-occurrence Matrix" Proceedings of the Spatial Analysis and GEOmatrics conference, 2015. (14 pages).
Aghdam, Hamed Habibi & Heravi, Elnaz Jahani, "Guide to Convolutional Neural Networks: A Practical Application to Traffic-Sign Detection and Classification" (303 pages).
Chen, Y. et al., "A Spectral Signature Shape-Based Algorithm for Landsat Image Classification" International Journal of Geo-Information, 2016. (16 pages).
Ji, S. et al., "3D Convolutional Neural Networks for Human Action Recognition" IEEE Transactions On Pattern Analysis and Machine Intelligence, vol. 35 No. 1, Jan. 2013. (11 pages).
Liu, Yu Han, "Feature Extraction and Image Recognition with Convolutional Neural Networks" First International Conference on Advanced Algorithms and Control Engineering, 2018. (8 pages).
Gerhards, Dr. R., "Evaluation of weed populations under the influence of site-specific weed control to derive decision rules for a sustainable weed management" 2008. (86 pages).
Pakhira, Malay K., "Digital Image Processing and Pattern Recognition" PHI Learning Private Limited, Delhi, 2014. (11 pages).
Khan, S. et al., "A Guide to Convolutional Neural Networks for Computer Vision" Synthesis Lectures On Computer Vision, Lecture #15, Jan. 2018. (15 pages).
Klemmedson, James O. & Smith, Justin G., "Cheatgrass (*Bromus tectorum* L.)" The Botanical Review, pp. 226-262. (37 pages).
Leondes, Cornelius T., "Image Processing and Pattern Recognition" Neural Network Systems Techniques and Applications, vol. 5, 1998. (407 pages).
Shih, Frank Y., "Image Processing and Pattern Recognition: Fundamentals and techniques" IEEE Press, 2010. (30 pages).
Meier, Uwe, "Growth stages of mono- and dicotyledonous plants: BBCH Monograph" Julius Kuhn Institut, 2018. (204 pages).
Duong et al., "Spectral signatures in landsat 8 oli image and their interpretation for land cover study" Institute of Geography, Vietnam Academy o Science and Technology, Jan. 2014. (10 pages).
Simonyan, K. & Zisserman, A., "Two-Stream Convolutional Networks for Action Recognition in Videos" NeurIPS Proceedings, NIPS, 2014. (9 pages).
Karpathy, A. et al., "Large-scale Video Classification with Convolutional Neural Networks" IEEE Conference on Computer Vision and Pattern Recognition, 2014. (8 pages).
Baccouche, M. et al., "Sequential Deep Learning for Human Action Recognition" Lecutre Notices in Computer Science, LNIP vol. 7065, pp. 29-39, 2011. (11 pages).

* cited by examiner

RGB components   Convolutional Layers   Fully Connected Layers

IMAGE MONITORING FOR CONTROL OF INVASIVE GRASSES

CROSS-REFERENCE TO RELATED APPLICATIONS

This application is a U.S. national stage filing under 35 U.S.C. § 371 of International Application No. PCT/US2021/027299, filed on Apr. 14, 2021, which claims the benefit of, and priority to, U.S. Provisional Patent Application Ser. No. 63/011,955, filed on Apr. 17, 2020. The entire disclosure of each of the above applications is incorporated herein by reference.

FIELD OF THE INVENTION

The present invention relates to weed mapping, monitoring and control, in particular to the mapping, monitoring and control of invasive annual grasses.

BACKGROUND OF THE INVENTION

Invasive annual grasses are a serious concern particularly in the western United States and continue to spread rapidly across non-crop and rangeland areas displacing native vegetation. Exotic annual grasses are highly competitive with native perennial grasses and greatly reduce above- and below-ground biomass, deplete soil moisture, and reduce native plant diversity. As invasive annual grasses continue to increase, effective management becomes critical for restoring and maintaining native rangeland ecosystems.

Invasive annual grasses also exert negative impacts on croplands and agriculture. It is estimated that at least 100 million acres of cropland in the western United States are infested with sonic level of downy brome (*Bromus tectorum*, also known as cheatgrass). The mat-like rooting system of downy brome and its ability to grow further into the winter season than the native grass species, allows downy brome to easily outcompete the native grass species in the spring when soil water and nutrients are abundant.

In addition to competing for water resources, downy brome produces significant amounts of dead, above-ground biomass that accelerates wildfire in both rangeland and in cropland, and downy brome matures just prior to the highest risk period for fire risk in the West. The dead, above-ground biomass comprises a fine, dense mat of highly flammable fuel susceptible to ignition, which accelerates fire cycles. Accordingly, fire size, intensity and frequency have increased dramatically with the expansion of annual grass weed infestations. In addition to disrupting the ecology and ecosystem, fire can be devastating to rangeland and standing crops and leaves the soil more vulnerable to erosion and runoff.

Herbicides for controlling invasive annual grasses are available. However, infested areas have to be identified in advance since blanket spraying is cost-intensive and may involve undesirable environmental impact. Techniques are thereby sought to reduce the amount of herbicide wasted, In addition, herbicides usually do not reduce the seed bank. Seed bank longevity is typically underestimated, and some downy brome seeds can remain in the soil for years.

Thus, what is needed are methods that permit control of invasive grass weeds without negatively affecting native plants or crops, and not changing the soil ecosystem, thereby allowing for preservation and restoration of sagebrush-steppe habitats and increased agricultural productivity.

Fortunately, as will be clear from the following disclosure, the present invention provides for these and other needs.

SUMMARY

In one aspect, the present disclosure provides a computer-implemented method for mapping a weed, the method comprising: (a) receiving one or more images of a geographical area, the one or more image(s) displaying the geographical area at one or more point(s) in time during a phenological cycle of the weed, (b) analyzing the one or more image(s) and identifying one or more image area(s) in the one or more image(s), the image area(s) showing a spectral signature, the spectral signature being characteristic of the weed at the one or more point(s) in time during the phenological cycle of the weed, (c) identifying one or more geographical subareas, the geographical subarea(s) corresponding to the identified image area(s), (d) creating a weed distribution map of the geographical area on which the identified geographical subarea(s) is/are marked as (an) area(s) affected by the weed, and (e) displaying the weed distribution map on a monitor and/or storing the map in a data storage and/or transmitting the map to a separate computer system.

In another aspect, the present disclosure provides a computer system, the computer system comprising a receiving unit, a processing unit, and an output unit, wherein the receiving unit is configured to provide the processing unit with one or more image(s) of a geographical area, the one or more image(s) displaying the geographical area at one or more point(s) in time during a phenological cycle of a weed; wherein the processing unit is configured to analyze the one or more image(s) to identify one or more image area(s) in the one or triore image(s), the image area(s) showing a spectral signature, the spectral signature being characteristic of the weed at the one or more point(s) in time during the phenological cycle of the weed, wherein the processing unit is configured to identify one or more geographical subarea(s) corresponding to the identified image area(s); wherein the processing unit is configured to create a weed distribution map of the geographical area on which the identified geographical subarea(s) is/are marked as (an) area(s) affected by the weed; and wherein the output unit is configured to output the map.

In another aspect, the present disclosure provides a non-transitory storage medium storing instructions executable by a computer system to create a map by operations including: (a) receiving one or more images of a geographical area, the one or more image(s) displaying the geographical area at one or more point(s) in time during a phenological cycle of the weed, (h) analyzing the one or more image(s) and identifying one or more image area(s) in the one or more image(s), the image area(s) showing a spectral signature, the spectral signature being characteristic of the weed at the one or more point(s) in time during the phenological cycle of the weed, (c) identifying one or more geographical subareas, the geographical subarea(s) corresponding to the identified image area(s), (d) creating a weed distribution map of the geographical area on which the identified geographical subarea(s) is/are marked as (an) area(s) affected by the weed, (e) displaying the weed distribution map on a monitor and/or storing the map in a data storage and/or transmitting the map to a separate computer system.

Further aspects and embodiments of the present invention are disclosed hereinafter.

DETAILED DESCRIPTION

Aspects and embodiments of the present invention are described more fully hereinafter with reference to the accompanying drawings, in which some, but not all embodiments of the invention are shown. Indeed, the invention may be embodied in many different forms and should not be construed as limited to the embodiments set forth herein.

Likewise, many modifications and other embodiments of the present invention described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Unless defined otherwise, all technical and scientific terms used herein have the same meaning as commonly understood by one of skill in the art to which the invention pertains. Although specific terms are employed herein, they are used in a generic and descriptive sense only and not for purposes of limitation.

The singular terms "a," "an," and "the" include plural referents unless context clearly indicates otherwise. Similarly, the word "or" is intended to include "and" unless the context clearly indicates otherwise.

The operations in accordance with the teachings herein may be performed by at least one computer specially constructed for the desired purposes or a general-purpose computer specially configured for the desired purpose by at least one computer program stored in a non-transitory computer readable storage medium. The term "non-transitory" is used herein to exclude transitory, propagating signals or waves, but to otherwise include any volatile or non-volatile computer memory technology suitable to the application.

The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices. The term "computer system" refers to a system comprising one or more computers and optionally further devices such as e.g. an image acquisition unit, and/or a printer and/or a monitor and/or a data storage and/or an application device (such as a spraying unit) and/or others.

Any suitable processor/s, display and input means may be used to process, display (e.g. on a monitor or other computer output device), store, and accept information such as information used by or generated by any of the methods described herein. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs, RAMS, ROMs, EPROMs, EEPROMs, magnetic or optical or other cards, for storing; and keyboard or mouse for accepting. Modules shown and described herein may include any one or combination or plurality of: a server, a data processor, a memory/computer storage, a communication interface, a computer program stored in memory/computer storage. The term "process" as used above is intended to include any type of computation or manipulation or transformation of data represented as physical, e.g. electronic, phenomena which may occur or reside e.g. within registers and/or memories of at least one computer or processor. The above devices may communicate via any conventional wired or wireless digital communication means, e.g. via a wired or cellular telephone network or a computer network such as the Internet.

The computer system of the present invention may include, according to certain embodiments of the invention, machine readable memory containing or otherwise storing a program of instructions which, when executed by the machine, implements some or all of the system, methods, features and functionalities of the invention shown and described herein. Alternatively or in addition, the computer system of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may, wherever suitable, operate on signals representative of physical objects or substances.

In one aspect, the present invention provides a method for creating a weed (distribution) map.

As used herein, the term "weed" refers to a wild plant growing where it is not wanted and that may be in competition with desired plants. Weeds are typically characterized by rapid growth and/or ease of germination and/or competition with crops or native plants for space, light, water and nutrients.

According to some embodiments of the invention, the weed species of interest is traditionally non-cultivated.

According to another embodiment, the weed is a grass weed.

The term "grass weed" as used herein, refers to invasive grasses that grow profusely and damage or have the potential to damage native ecosystems and compete with crop species. The grass weed may be exotic and/or non-native in the geographical areas where it is invasive. Typically, non-native invasive grass weeds are introduced as a direct or indirect result of human activity. Having been moved by humans to a region in which they do not naturally exist and grow, invasive grass weeds typically are able to flourish, crowding out native vegetation and the wildlife that feeds on it. In general, invasive grass weeds have a competitive advantage because they are no longer controlled by their natural predators, and thus, can quickly spread out of control. In some exemplary embodiments, invasive grass weeds change ecosystem processes such as hydrology, fire regimens, and soil chemistry. Exemplary invasive grass weeds include but are not limited to downy brome/cheatgrass (*Bromus tectorum*), medusahead (*Taeniatherum caput-medusae*), ventenata (*Ventenata dubia*) and red brome (*Bromus rubens*), According to some embodiments of the invention the weed is an invasive winter annual grass.

According to some embodiments of the invention, the computer system of the present invention is configured to create a weed (distribution) map for more than one specific weed.

The term "map" as used herein means a drawing or other representation of all or part of the earth's surface. According to some embodiments of the invention, the term "map" refers to a representation of the features of a geographical area of the earth, showing them in their respective forms, sizes, and relationships according to some convention of representation, such as a visual or graphical representation.

The term "weed map" or "weed distribution map" refers to a map of a geographical area showing geographical subareas in which a certain weed is growing. The subareas in which the weed is growing and/or the weed itself can be indicated on a weed map by a specific color and/or texture and/or marking, From such a weed map, a person can obtain an information about the respective geographical area: the person can obtain the information, in which subareas (if any) the specified weed is present and in which subareas (if any) the specified weed is absent.

In a preferred embodiment of the present invention, the weed map is a digital weed map, "Digital" means that the weed map may be processed by a machine such as a computer system. A digital weed map can be, for example, created by using a computer system, it can be displayed, for example, on a monitor belonging to the computer system, it can be stored, for example, in a data storage belonging to the computer system and/or it can be printed, for example, on a printer belonging to the computer system. Examples of (digital) weed maps may be found in the literature (see e.g. Carina Ritter: *Evaluation of weed populations under the influence of site-specific weed control to derive decision rules for a sustainable weed management*, PhD thesis, Institute of Phytomedicine, Weed Science Department, University of Hohenheim, under the supervision of Prof. Dr, R. Gerhards, 2008; GB2447681A; U.S. Pat. No. 6,199,000; US 2009/0132132A1; WO00/23937; WO2018/001893A1, the contents and disclosures of which are incorporated herein by reference.

The weed map according to the present invention is created for a geographical area on the basis of one or more image(s) of or showing said geographical area.

As it is described hereinafter, the one or more image(s) of the geographical area is/are used in order to determine whether there are geographical subareas within the geographical areas which are infested by a specific weed. it is also possible that the whole geographical area is infested by a specific weed or that there is no infestation.

The term "image" as used herein means the general concept of a visualization or graphical representation of a multi-dimensional dataset within a geometric framework and is not specifically limited to the particular implementation of a photograph. The dataset contains information or measurements. In the case of a commonly known specific case, a typical standard digital color photograph, for example, the dimensions of measurement may be the amount of light energy sampled in three ranges of wavelengths (red, green, blue), and the geometric framework for a corresponding image may be an arbitrary two-dimensional Cartesian framework based on the viewing geometry—e.g., a picture.

In some embodiments, the one or more .image(s) is/are (a) digital representation.(s) (e.g., digital image(s)) of a geographical area. A digital image is a numeric representation, normally binary, of a geographical area. Depending on whether the image resolution is fixed, it may be of vector or raster type. In some embodiments, the one or more image(s) is/are (a) raster image(s) holding RGB color values in three image channels. The RGB color model is an additive color model in which red (R), green (G) and blue (B) are added together in various ways to reproduce a broad array of colors. Alternatively, the at least one image may be in Color Space Pixel (YUV) format having brightness, luminance, and color chrominance values. Other formats are conceivable as well. According to some embodiments of the invention, the at least one image is in GeoTIFF, Raster, REG, netCDF or HDF format.

According to some embodiments of the invention, the one or more image(s) comprise(s) geographical coordinates of the geographical area the image(s) is/are showing.

According to some embodiments of the invention, each image comprises information about the point in time it was generated or about the time point at which the geographical area was imaged.

The image datasets may be generated from at least some visible wavelength light (e.g. 400 nm-600 nm), e.g. red light (650 nm-700 nm), and/or at least some non-visible wavelength light (e.g. greater than 700 nm), e.g. near-infrared light (e.g. greater than 700 nm). The image datasets collected will depend on the feature(s) to be determined from the one or more images. The image datasets may be collected by a visible spectrum image sensor, such as a conventional digital camera, e.g. detecting wavelengths of less than 700 nm, in combination with a near-infrared image sensor, e.g. detecting wavelengths of greater than 700 nm, or alternatively by a multispectral image sensor that detects wavelengths of less than 700 nm and wavelengths of greater than 700 nm, e.g. at least 600 nm-800 nm.

The one or more image(s) is/are usually generated by means of one or more image acquisition unit(s) such as a camera.

The image acquisition unit may be a multi-spectral camera, which may generate image data from a plurality of wavelength bands, for example any combination of a blue band (e.g.

including at least some wavelengths in the range 455 nm-495 nm), a green hand (e.g. including at least some wavelengths in the range 540 nm 580 nm), a red hand (e.g. including at least some wavelengths in the range 660 nm 680 nm), a red-edge band (e.g. including at least some wavelengths in the range 710 nm 730 nm) and a near-infrared band (e.g. including at least some wavelengths in the range 800 nm-880 nm). However, an imaging device comprising a greater number of bands, e.g. greater than 100 hands, such as a so-called hyper-spectral camera, may also be used.

The image acquisition unit may also include a transmitter of electromagnetic radiation, and the imaging sensor may detect a reflected portion of the transmitted electromagnetic radiation. The images may therefore consist at least partially of data generated from a reflected portion of the transmitted electromagnetic radiation that is detected by the imaging device. The transmitter of electromagnetic radiation may be a laser or may form part of a radar system. Examples of suitable systems include a LIDAR system (Light Detection and Ranging) and an SAR system (Synthetic-Aperture Radar).

The image acquisition unit may be fixed relative to the geographical area, e.g. on a fixed boom or mast. Alternatively, the image acquisition unit may be movable relative to the geographical area, e.g. on a vehicle. The vehicle may be grounded, e.g. a car, a tractor, or a piece of machinery that is treating plants. Alternatively, the vehicle may be airborne, e.g. an aircraft or a remotely piloted aircraft system (e.g., a drone). The drone may be a fixed wing, single-rotor or multi-rotor drone.

The image acquisition unit may be pre-installed on the vehicle, Alternatively, the image acquisition unit may be retrofitted to the vehicle.

Images can also be acquired by one or more satellites.

The image acquisition unit may, for example, be attached to an aircraft and/or an unmanned aerial vehicle (UAV) and/or a farming machine (such as a tractor) and/or a balloon, and/or a robot and/or a satellite. In order to cover large geographical areas like the sagebrush steppes in the US, the image acquisition unit may be attached to a manned or unmanned aerial vehicle and/or a satellite.

In an embodiment, satellite imagery is used. With increasingly capable satellites being commissioned and launched, remotely-sensed multispectral earth imagery has become increasingly available and useable. For example, as the number of satellite image acquisition systems in operation grows, acquisition ability and flexibility improves. In an example, DigitalGlobe (www.digitalglobe.com) currently operates a number of satellites including, IKONOS, Geo-Eye-1, QuickBird, WorldView 1, WorldView 2, and WorldView 3. Accordingly, around the clock global coverage may be achieved through the satellite constellation currently in operation. For instance, the DigitalGlobe constellation of satellites can image the entire earth's landmass every 75 days and may capture over six times the earth's landmass every year with a capacity to collect at least 2.6 million square kilometers of imagery a day. With selective tasking, DigitalGlobe's satellite constellation may quickly and continually collect imagery from targeted locations to provide near real time feedback on global events or the like.

According to some embodiments of the invention, images from different sources are used.

The image data may be transmitted to a central processing unit (CPU) located on the vehicle, or where the vehicle operator is located externally from the vehicle, to an external CPU. Images may be recorded at predetermined time intervals as the imaging device is moved relative to the geographical area and/or image recording is initiated by a person and/or triggered by an event.

For the determination of whether a specific weed is present in a geographic area, one or more image(s) is/are used, the one or more image(s) showing (displaying) the geographical area at one or more point(s) in time, such as during a phenological cycle of the weed.

The detection of a specific weed in a geographical area may be based on a spectral signature. The spectral signature may be characteristic of the weed at the one or more point(s) in time during a phenological cycle of the weed.

The concept of "phenology" is often defined as the study of the timing of seasonally recurring phenomena in plants. During a seasonal life cycle, a plant is undergoing characteristic stages which are also referred to as phenobases, A "phenophase" is an observable stage or phase in the seasonal life cycle of a plant that can be defined by a start and an end point. The terms "phenobase", "growth stage", "phenological stage", and "development stage" are herein used interchangeably. Principal growth stages (phenophases) are for example: germination/sprouting/bud development; leaf development (main shoot); formation of side shoots/tittering; stem elongation or rosette growth/shoot development (main shoot); development of harvestable vegetative plant parts or vegetatively propagated organs hooting (main shoot); inflorescence emergence (main shoot)/heading; flowering (main shoot); development of fruit; ripening or maturity of fruit and seed; and senescence, beginning of dormancy Other examples of phenobases (growth stages, development stages) can be found in: Meier, U.: "*Growth stages of mono- and dicotyledonous plants*"; BBCH Monograph 2001; doi:10.5073/bbch0515, the content and disclosure of which is incorporated by reference.

Not every weed undergoes each of the stages mentioned above. However, at each stage of a phenological cycle of a plant, the plant may show characteristic properties which can be captured by an image and which can be used in order to identify the respective plant.

According to some embodiments of the invention, at least one image of a geographical area is captured at a defined point in time at which a specific weed (usually) is at a defined phenological stage. For many weeds it is very well known, at which point in time (during a season) the weed is (usually) at a defined phenological stage. The geographical coordinates of the geographical area, the climate conditions in the geographical area and/or historical weather conditions (of the last days, weeks, months and/or years) in the geographical area can be used in order to determine the (assumed) phenological stage of a specific weed at a certain point in time. In other words, a defined time point for image acquisition is selected for a geographical area; at the defined time point, a specific weed (being in that geographical area) may be at a defined phenological stage; an image of the geographical area is captured; if there is an area in the image which shows the specific weed at the defined phenological stage, the respective area shows a spectral signature which is characteristic of the weed at the defined phenological stage.

The term "spectral signature" as used herein means any variation of reflectance or emittance of a material with respect to wavelengths. The spectral signature of an object is a function of the incidental electromagnetic wavelength and material interaction with that section of the electromagnetic spectrum. In sonic examples, the spectral signature may be a spectral signature in the solar-reflective region as a function of wavelength.

One example of a characteristic property of a weed at a defined phenological stage which causes a spectral signature which is characteristic of the weed at the defined phenological stage is the color of the weed at that phenological stage.

For example, as the seed of downy brome ripen, the plant goes from green to purple to straw-colored (Klemmedson, J O; Smith, J G (1964). "*Cheatgrass (Bromus tectorum* L)". Botanical Review, 30 (2): 226-262), the entire content and disclosure of which is incorporated by reference, In particular the purple color is characteristic for downy brome in a defined phenological stage, Furthermore, other plants usually do not show such a purple color. The spectral signature caused by the purple color can therefore be used for the detection/identification of downy brome.

According to some embodiments of the invention, the spectral signature which is caused by a color change of a weed changing from one phenological stage to another phenological stage can be used for the identification of said weed, In case of downy brome for example, the spectral. signature caused by the color change from green to purple and/or from purple to straw-colored can be used for the identification of downy brome.

The terms "color" and "color change" as used herein are not meant to be limited to the absorption and/or reflection and/or transmission of visible light but are intended to cover any characteristic absorption and/or reflection and/or transmission and/or diffraction and/or scattering of electromagnetic radiation and/or any changes thereof in any part(s) of the electromagnetic spectrum.

Instead of or in addition to a specific color and/or one or more specific color changes, any other feature(s) of a plant which can be captured in an image and optionally which undergo(es) a (characteristic) change in time (during a phenological cycle of the weed) can be used for identification of the weed. Examples may include dimensions (e.g. height, width), form(s), shape(s), texture and the like.

Spectral signatures may be extracted from digital images at each pixel. The spectral signatures on pixel-level can then be used to divide the image in groups of similar pixels (segmentation). To each pixel or group of pixels a class can be assigned (classification) by comparing the spectral signature of a pixel or group of pixels with known (reference) spectral signatures.

According to some embodiments of the invention, at least two images depicting a weed at two different phenological stages are used for the detection of the weed in a geographic area (because two sequentially collected images are required in order to identify a characteristic temporal change). In other words, images are collected at two or more points in time during a phenological cycle of a weed, including a first point in time and a second point in time. The first point in time can be a time point at which the weed (usually) is at a first phenological stage. The second point in time can be a time point at which the weed (usually) is at a second phenological stage. According to some embodiments, the first phenological stage of the weed may differ from the second phenological stage of the weed. The weed plant at the first phenological stage may have at least one property which is different from the properties of said weed plant at the second phenological stage, For many weeds, the phenological stage(s) is/are very well known, at which point in time (during a season) the weed is (usually) at a defined phenological stage. The geographical coordinates of the geographical area, the climate conditions in the geographical area and/or historical weather conditions (of the last days, weeks, or months) in the geographical area can be used in order to determine the (assumed or predicted) phenological stage of a specific weed at a certain point in time. In other words, time points for image acquisition can be selected in a way that at least two images are created, a first image showing the geographical area at a time point at which the specified weed (being in that geographical area) usually is at a first phenological stage, and a second image showing the geographical area at a time point at which the specified weed (being in that geographical area) usually is at a second phenological stage.

A computer system of the present invention is configured to receive the one or more image(s) for mapping and optionally further purposes. Therefore, the computer system of the present invention comprises a receiving unit. Images may be stored in an external data storage, to which the computer system may be connected via a network: in such a case, the receiving unit may he configured to access the external data storage and read the image data from the external data storage and provide them to the processing unit of the computer system of the present invention. Images may be stored in an external data storage which is part of an external computer system, and the external computer system may be configured to transmit the images to the computer system of the present invention via a network: in such a case, the receiving unit may be configured to receive the images from the external computer system via the network and provide them to the processing unit of the computer system of the present invention. Images may be stored on a mobile data medium in the possession of a user: in such a case, the receiving unit may provide input means to the user for transmitting the images from the mobile data.

medium to the processing unit of the computer system of the present invention. Images may he stored on an internal data storage which is part of the computer system of the present invention: in such a case, the receiving unit may be configured to read the image data from the internal data storage and provide them to the processing unit of the computer system.

The processing unit of the computer system of the present invention may be configured to analyze the one or more image(s). The analysis may identify one or more areas in the images which show a spectral signature, the spectral signature being characteristic of a specific weed at one or more point(s) in time during the phenological cycle of the weed. As described herein, the characteristic spectral signature may be caused by a specific weed which is located in one or more geographical subareas, the geographical subareas being represented by one or more areas in the images.

In other words, the processing unit may be configured to analyze the one or more image(s) in order to check whether a specific weed is captured in the images. If a specific weed is captured in the one or more image(s), the processing unit may be configured to identify the areas in the image(s) which show the specific weed. When the image(s) represent(s) a geographical area, the identified areas in the images represent geographical subareas infested by the weed.

If, for example, the specific weed is in a defined phenological stage, the weed may have characteristic properties which are captured in the one or more image(s). For example, the color of the weed may be represented in an image by specific values of the RGB channels. In order to identify the specific weed in an image, the values of the RGB channels of each pixel can be compared with the specific values for the color of the weed. Upper and lower thresholds can be defined for each RGB channel. If the values of each RGB channel of a pixel lie within the ranges defined by the upper and lower thresholds, the pixel may be considered to represent a weed.

If, for example, the specific weed undergoes a characteristic color change which is captured in at least two images, the images can be analyzed in order to identify image areas exhibiting characteristic changes of parameters representing the color change. If, for example, the specific weed undergoes a color change from green to purple, the RGB values of each pixel of each image can be determined, and whether there are any image areas having a temporal change of the RGB values corresponding to a color change from green to purple can be checked or determined.

For analysis of a plurality of images, pattern (feature) recognition methods can be used. Examples of pattern recognition methods can be found in various text books (see e.g. C. T. Leondes: *Image Processing and Pattern Recognition,* Academic Press 1998, ISBN: 0-12-443865-2; F. Y. Shih: *Image Processing and Pattern Recognition,* Wiley 2010, ISBN: 978-0-470-40461-4; M. K. Pakhira: Digital *Image Processing and Pattern Recognition,* PHI Learning Private Limited 2011, ISBN: 978-81-203-4091-6), the entire contents and disclosures of which are incorporated by reference.

The use of pattern recognition methods may require some knowledge about the phenological stages of a specific weed and about how changes of phenological stages appear in a plurality images depicting said weed.

Less knowledge may be required if machine learning algorithms are used, Machine learning is the scientific study of algorithms and statistical models that computer systems use to perform a specific task without using explicit instructions, relying on patterns and inference instead. It is seen as a subset of artificial intelligence, Machine learning algorithms build a mathematical model based on sample data known as "training data", in order to make predictions or decisions without being explicitly programmed to perform the task.

In an embodiment of the present invention, a classification algorithm is used in order to identify a weed in one or more images.

"Classification" the task of identifying to which of a set of categories a new observation belongs, on the basis of a training set of data containing observations whose category membership or features is/are known.

Spectral signatures may be used by classification algorithms that allow the pixels of an image to be labeled or classified. Different materials can have similar spectral signatures (for example, construction, water, bare soils and vegetation cover).

The basis of a classification may be used to find sonic areas of the electromagnetic spectrum. in which the nature of this interaction is different for the materials within the image.

Conventional supervised image classification relies on training data (sites for which there are direct observations of land cover) that coincide temporally with the images used The training data and one or more images for the same sites can be used in multivariate statistical algorithms to create a predictive model, that is used to classify the one or more images into land cover classes.

Such training data, however, may not be available for all geographical areas. One approach to overcome this problem of missing training data is using visual interpretation by experts.

An alternative approach is to use a signature derived from training data and a matching image from another period and apply this to the images for which no training data are available. Such signature extension can also be used to classify images by applying signatures obtained from a different domain, whether location, time period, or sensor. Temporal signature extension has yielded better results than spatial signature extension (see e.g. M. Pax-Lenneyet al.: *Forest mapping with a generalized classifier and Landsat TM data.* Remote Sensing of Environment, 2001, 77:241-250), the content and disclosure of which are incorporated herein by reference.

More information about classification can be found in the literature (see e.g. Y. Cheri et al: A Spectral Signature Shape-Based Algorithm for Landsat Image Classification, International Journal of Geo-Information, 2016, 5, 154; N. Dinh Luong et al.: *Spectral signatures in landsat 8 oli image and their interpretation for land cover study,* 35th Asian Conference on Remote Sensing 2014, ACRS 2014: Sensing for Reintegration of Societies; F. Ghedass et al.: *An improved classification of hyperspectral imaging based on spectral signature and gray level co-occurrence matrix,* Proceedings of the Spatial Analysis and GEOmatics conference, SAGE( )2015), the content and disclosure of which are incorporated herein by reference.

In another embodiment of the present invention, a convolutional neural network (CNN) is used for image analysis.

A CNN is a class of deep neural networks, most commonly applied to analyzing visual imagery. A CNN comprises an input layer with input neurons, an output layer with at least one output neuron, as well as multiple hidden layers between the input layer and the output layer.

The hidden layers of a CNN may consist of convolutional layers, ReLU (Rectified Linear Units) layers i.e. activation function, pooling layers, fully connected layers and normalization layers.

The nodes in the CNN input layer may be organized into a set of "filters" (feature detectors), and the output of each set of filters may be propagated to nodes in successive layers of the network. The computations for a CNN may include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map, For example, the input to a convolution layer can be a multidimensional array of data that defines the various color components of an input image. The convolution kernel can be a multidimensional array of parameters, where the parameters are adapted by the training process for the neural network.

The objective of the convolution operation can be to extract the high-level features such as edges, from the input image. Conventionally, the first convolutional layer is responsible for capturing the low-level features such as edges, color, gradient orientation, etc. With added layers, the architecture adapts to the high-level features as well, giving a network which has the wholesome understanding of images in the dataset. Similar to the convolutional layer, the pooling layer can be responsible for reducing the spatial size of the convolved feature. This can decrease the computational power required to process the data through dimensionality reduction. Furthermore, it can be useful for extracting dominant features which are rotational and positional invariant, thus maintaining the process of effectively training of the model. Adding a fully-connected layer can be an inexpensive way of learning non-linear combinations of the high-level features as represented by the output of the convolutional layer. The fully-connected layer may team a possibly non-linear function in that space. A fully connected layer is at the end of a convolutional neural network. The features map produced by the earlier layer may be flattened to a vector. Then this vector may be fed to a fully connected layer so that it captures complex relationships between high-level features.

More details about how to implement a convolutional neural network and how to generate a feature vector from the CNN is described in the literature (see e.g. Yu Han Liu: *Feature Extraction, and Image Recognition with Convolutional Neural, Networks,* 2018, J. Phys.: Conf. Ser. 1087 062032; H. H. Aghdam et al.: *Guide to Convolutional Neural Networks,* Springer 2017, ISBN: 978-3-319-57549-0; S. Khan et aL: Convolutional Neural Networks for Computer Vision, Morgan & Claypool Publishers, 2018, ISBN: 978-1-681-730219, the contents and disclosures of which are incorporated herein by reference).

When moving from one image to a plurality of images (sequence of images), the complexity of the task is increased by the extension into the temporal dimension. This dimension can be processed by introducing 3D convolutions, additional multi-frame optical flow images, or recurrent neural networks (RNNs).

Recurrent neural networks (RNNs) are a family of feedforward neural networks that include feedback connections between layers. RNNs enable modeling of sequential data by sharing parameter data across different parts of the neural network. The architecture for a RNN can include cycles. The cycles represent the influence of a present value of a variable on its own value at a future time, as at least a portion of the output data from the RNN can be used as feedback for processing subsequent input in a sequence.

When analyzing a sequence of images, space and time can be treated as equivalent dimensions and processed via e.g., 3D convolutions. This was explored in the works of Baccouche et al. (Sequential Deep Learning for Human Action Recognition; International Workshop on Human Behavior Understanding, Springer 2011, pages 29-39) and Ji et al. (3D Convolutional Neural Networks for Human Action Recognition, IEEE transactions on pattern analysis and machine intelligence, 35(1), 221-231), the contents and disclosures of which are incorporated by reference. On the other hand, one can train different networks, responsible for time and space, and finally fuse the features, which can be found in publications of Karpathy et al. (Large-scale Video Classification with Convolutional Neural Networks; Proceedings of the IEEE conference on Computer Vision and Pattern Recognition, 2014, pages 1725-1732), and Simonyan & Zisserman (Two-stream Convolutional Networks for Action Recognition in Videos; Advances in neural information processing systems, 2014, pages 568-576), the contents and disclosures of which are incorporated by reference.

So, an artificial neural network can be trained with images for which it is known whether there is a specific weed captured in the images or not, For each image, it may also be known at which point in time the image has been taken and/or which phenological cycle of the weed the image is showing. Knowledge about the geographical coordinates of the location of the weed or the region where the weed is growing can be used as well. All said knowledge can be used for the training of the artificial neural network. The aim of the training is to create an artificial neural network which uses one or more image(s) as input and determines areas in the image(s) which represent a specific weed as an output.

There can be one artificial neural network for each specific weed species or for a group of weed species showing similar behavior (phenological stages).

Training estimates network weights that allow the network to calculate (an) output value(s) close to the measured output value(s). A supervised training method can be used in which the output data is used to direct the training of the network weights. The network weights can be initialized with small random values or with the weights of a prior partially trained network. The training data inputs can be applied to the network, and the output values can be calculated for each training sample. The network output values can be compared to the measured output values. A backpropagation algorithm can be applied to correct the weight values in directions that reduce the error between measured and calculated outputs. The process can be iterated until no further reduction in error can be made or until a predefined prediction accuracy has been reached.

A cross-validation method can be employed to split the data into training and validation data. sets. The training data set can be used in the backpropagation training of the network weights. The validation data set can be used to verify that the trained network generalizes to make good predictions. The best network weight set can be taken as the one that best predicts the outputs of the test data set. Similarly, varying the number of network hidden nodes and determining the network that performs best with the data sets can optimize the number of hidden nodes.

When trained, the connection weights between the processing elements contain information regarding the relationship between the one or more image(s) (input) and image areas depicting weed (output).

Forward prediction uses the trained network to determine image areas in the one or more images, the image areas depicting a specific weed, on the basis of the one or more image(s) of a geographical area, the image(s) showing the geographical area at one or more point(s) in time, A feed forward calculation through the network can be made to predict the output property value(s). The predicted measurements can be compared to (a) property target value(s) or tolerance(s). Since this embodiment of the invention is based on historical data, predictions using such method typically have an error approaching the error of the empirical data, so that the predictions are often just as accurate as verification experiments.

Independently of the method which is used to analyze the one or more image(s), the result or output of the analysis can be information whether there are any areas in the image(s) which show a spectral signature which is characteristic of a weed at a defined phenological stage.

The processing unit can be configured to identify the geographical subarea(s) which correspond to the (identified) image area(s) which show the spectral signature. A geographical subarea which correspond(s) to an identified area of an image can be the one which is shown in the area of the image. In this context, "identification of the geographical subarea(s)" means determination of the geographical coordinates of the geographical subarea(s). The geographical coordinates of the geographical subarea(s) can be determined from the geographical area the one or more image(s) is/are showing.

The processing unit can be configured to generate a (weed distribution) map of the geographical area in which each identified geographical subarea (if any) denotes an area affected by the weed. The respective geographical subarea(s) can be marked by e.g. a certain color and/or hatching and/or shading and/or symbol(s) and/or text.

The generated (weed distribution) map can then be stored in a data storage and/or displayed on a monitor and/or transmitted to a separate computer system.

According to some embodiments of the invention, the degree of infestation of the geographical subarea(s) by the specific weed is determined and optionally outputted.

According to some embodiments of the invention, the name of the specific weed is outputted as well.

According to some embodiments of the invention, one or more products (e.g. herbicides) for controlling the specific weed is/are determined and optionally their names and/or links to providers of said products are outputted.

According to some embodiments of the invention, the costs for treating the geographical area(s) infested by the specific weed are determined and optionally outputted. The costs can be determined e.g. on the basis of the size of the geographical area(s) infested by the specific weed, the amount of herbicide to be applied per surface area, and the price of the herbicide. Costs for applying the herbicide (e.g., by a ground-based vehicle or an aircraft or a UAV) can be considered as well.

According to some embodiments of the invention, the computer system of the present invention is configured to determine a gradation of criticality of infested geographical subareas with regard to the risk associated with the geographical subarea being infested by the specific weed. If, for example, there is a general risk of fire damages caused by the presence of the specific weed in a geographical area, infested geographical subareas are identified and the risk of a fire outbreak in the respected geographical subareas and/or the amount of damages caused by a fire in the geographical subareas (and in neighboring subareas) is determined. The geographical subareas can be, for example, sorted according to their criticality. Criticality classes can be defined (e.g. three or five or ten classes). For each class the costs of treating the geographical subareas belonging to the class with a herbicide can be determined and optionally outputted.

According to some embodiments of the invention, the computer system of the present invention is configured to generate a prescription map on the basis of the generated weed (distribution) map. The prescription map displays the geographical subareas which are intended to be treated with a herbicide in order to control the specific weed. The geographical subareas to be treated can, for example, be the geographical subareas infested by the specific weed or the geographical subareas infested to a certain degree by the specific weed or the geographical subareas belonging to a certain class of criticality.

The prescription map can be, for example, automatically generated by the processing unit and/or selected or specified by a user on the basis of the generated weed distribution map.

According to some embodiments of the invention, the prescription map can be transmitted to a spraying device which is configured to treat a geographical area with a herbicide according to the prescription map. The spraying device can be part of a ground-based tractor, an aircraft, a drone or a robot.

According to some embodiments of the invention, the computer system according to the present invention is part of an autonomous system for controlling a weed. Another aspect of the present invention, therefore, is an autonomous system for controlling a weed. The autonomous system comprises means of locomotion. The autonomous system can be designed as a UAV or a robot or an autonomous ground-based vehicle. The autonomous system comprises an image acquisition unit which is configured to collect at least one image of the geographical area at a. point in time while it moves. The autonomous system comprises a processing unit which is configured to analyze the at least one image of the geographical area. The processing unit is configured to identify image areas in the at least one image which show a spectral signature which is characteristic of a weed at a defined phenological stage. The processing area is configured to identify geographical subareas which correspond to the identified image areas, The processing area is configured to cause a spraying device to treat identified geographical subareas with a herbicide.

FIG. 1 shows schematically one embodiment of the computer system according to the present invention. The computer system (1) comprises a receiving unit (1-1), a computer (2-1), and an output unit (1-5). The computer (1-2) comprises a processing unit (1-3), and a memory (1-4).

The receiving unit (1-1) is configured to provide the processing unit (1-3) with one or more image(s) of a geographical area, the one or more image(s) displaying the geographical area at one or more points in time during a phenological cycle of a weed.

The processing unit (1-3) is configured to analyze the one or more image(s) and thereby identify one or more image area(s) in the one or more image(s), the image area(s) showing a spectral signature, the spectral signature being characteristic of the weed at the one or more point(s) in time during the phenological cycle of the weed, identify one or more geographical subareas corresponding to the one or more identified image areas, and create a map of the geographical area in which the one or more identified geographical subareas denote areas affected by the weed.

The output unit (1-5) is configured to output the map.

The configuration of the components of the computer system (1) can be achieved e.g. by computer-readable program code stored in the memory (1-4).

Figure 2:
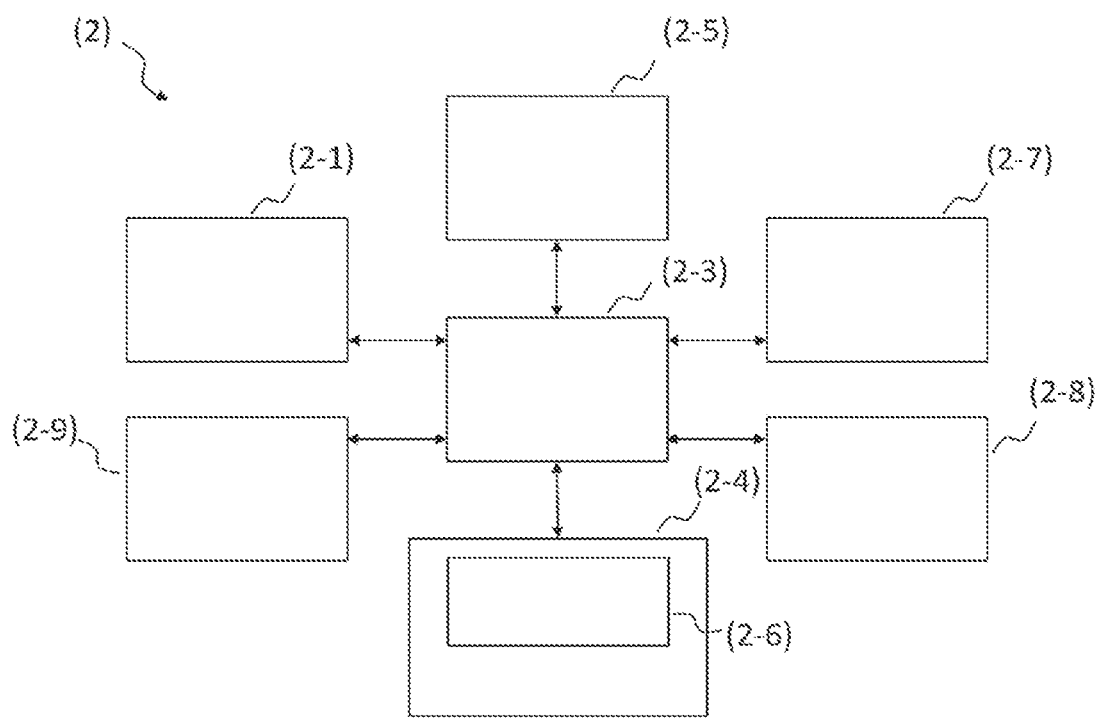

FIG. 2 illustrates a computer system (2) according to some example implementations of the present disclosure in more detail. Generally, a computer system of exemplary implementations of the present disclosure may be referred to as a computer and may comprise, include, or be embodied in one or more fixed or portable electronic devices. The computer system (2) may include one or more of each of a number of components such as, for example, processing unit (2-3) connected to a memory (2-4) (e.g., storage device).

The processing unit (2-3) may be composed of one or more processors alone or in combination with one or more memories. The processing unit (2-3) is generally any piece of computer hardware that is capable of processing information such as, for example, data, computer programs and/or other suitable electronic information. The processing unit (2-3) is composed of a collection of electronic circuits some of which may be packaged as an integrated circuit or multiple interconnected integrated circuits (an integrated circuit at times more commonly referred to as a "chip"). The processing unit (2-3) may be configured to execute computer programs, which may be stored onboard the processing unit (2-3) or otherwise stored in the memory (2-4) (of the same or another computer).

The processing unit (2-3) may be a number of processors, a multi-core processor or some other type of processor, depending on the particular implementation. Further, the processing unit (2-3) may be implemented using a number of heterogeneous processor systems in which a main processor is present with one or more secondary processors on a single chip. As another illustrative example, the processing unit (2-3) may be a symmetric multi-processor system containing multiple processors of the same type. In yet another example, the processing unit (2-3) may be embodied as or otherwise include one or more ASICs, FPGAs or the like. Thus, although the processing unit (2-3) may be capable of executing a computer program to perform one or more functions, the processing unit (2-3) of various examples may be capable of performing one or more functions without the aid of a computer program. In either instance, the processing unit (2-3) may be appropriately programmed to perform functions or operations according to example implementations of the present disclosure.

The memory (2-4) is generally any piece of computer hardware that is capable of storing information such as, for example, data, computer programs (e.g., computer-readable program. code (2-6)) and/or other suitable information either on a temporary basis and/or a permanent basis. The memory (2-4) may include volatile and/or non-volatile memory and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory (2-4) may be referred to as a computer-readable storage medium. The computer-readable storage medium is a non-transitory device capable of storing information and is distinguishable from computer-readable transmission media such as electronic transitory signals capable of carrying information from one location to another. Computer-readable medium as described herein may generally refer to a computer-readable storage medium or computer-readable transmission medium.

In addition to the memory (2-4), the processing unit (2-3) may also be connected to one or more interfaces for displaying, transmitting and/or receiving information. The interfaces may include one or more communications interfaces and/or one or more user interfaces.

The communications interface(s) may be one or more receiving units (2-1) configured to receive and/or transmit information, such as to and/or from other computer(s), network(s), database(s) or the like. The communications interface may be configured to transmit and/or receive information by physical (wired) and/or wireless communications links.

The communications interface(s) may include interface(s) (2-7) to connect to a network, such as using technologies such as cellular telephone, Wi-Fi, satellite, cable, digital subscriber line (DSL), fiber optics and the like. In some examples, the communications interface(s) may include one or more short-range communications interfaces (2-8) configured to connect devices using short-range communications technologies such as NEC, RFID, Bluetooth, Bluetooth LE, ZigBee, infrared (e.g., IrDA) or the like.

The user interfaces may include an output unit (2-5) such as a display. The display may be configured to present or otherwise display information to a user, suitable examples of which include a liquid crystal display (LCD), light-emitting diode display (LED), plasma display panel (PDP) or the like. The user input interface(s) (2-9) may be wired or wireless and may be configured to receive, information from a user into the computing system (1), such as for processing, storage and/or display. Suitable examples of user input interfaces include a microphone, image or video capture device (image acquisition unit), keyboard or keypad, joystick, touch-sensitive surface (separate from or integrated into a touchscreen) or the like. In some examples, the user interfaces may include automatic identification and data capture (AIDC) technology for machine-readable information. This may include barcode, radio frequency identification (RFID), magnetic stripes, optical character recognition (OCR), integrated circuit card (ICC), and the like. The user interfaces may further include one or more interfaces for communicating with peripherals such as printers and the like.

As indicated above, program code instructions may be stored in the memory (2-4) and executed by processing unit (2-3) that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, processing unit or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing unit or other programmable apparatus to configure the computer, processing unit or other programmable apparatus to execute operations to be performed on or by the computer, processing unit or other programmable apparatus.

Retrieval, loading and execution of the program code instructions may be performed sequentially such that one instruction is retrieved, loaded and executed at a time. In sonic example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by processing unit, or storage of instructions in a computer-readable storage medium, supports combinations of operations for performing the specified functions. In this manner, a computing system (2) may include processing unit (2-3) and a computer-readable storage medium or memory (2-4) coupled to the processing circuitry, where the processing circuitry is configured to execute computer-readable program code (2-6) stored in the memory. It will also be understood that one or more functions, and combinations of functions, may be implemented by special purpose hardware-based computer systems and/or processing circuitry which perform the specified functions, or combinations of special purpose hardware and program code instructions.

Figure 3:
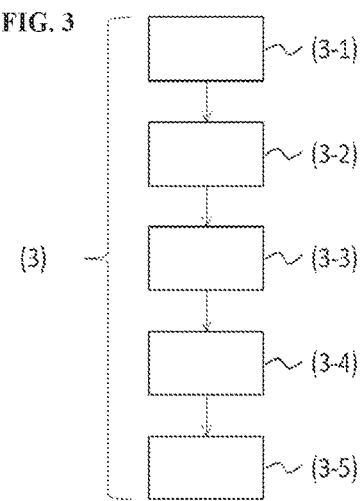

FIG. 3 shows schematically, in the form of a flow chart, an embodiment of the method according to the present invention. The method (3) comprises the steps:
  (3-1) receiving one or more images of a geographical area, the one or more image(s) displaying the geographical area at one or more point(s) in time during a phenological cycle of the weed,
  (3-2) analyzing the one or more image(s) and identifying one or more image area(s) in the one or more image(s), the image area(s) showing a spectral signature, the spectral signature being characteristic of the weed at the one or more point(s) in time during the phenological cycle of the weed,
  (3-3) identifying a geographical subarea, the geographical subarea corresponding to the identified image area,
  (3-4) creating a weed distribution map of the geographical area on which the identified geographical subarea is marked as an area affected by the weed,
  (3-5) displaying the weed distribution map on a monitor and/or storing the map i n a data storage and/or transmitting the map to a separate computer system.

Figure 4:
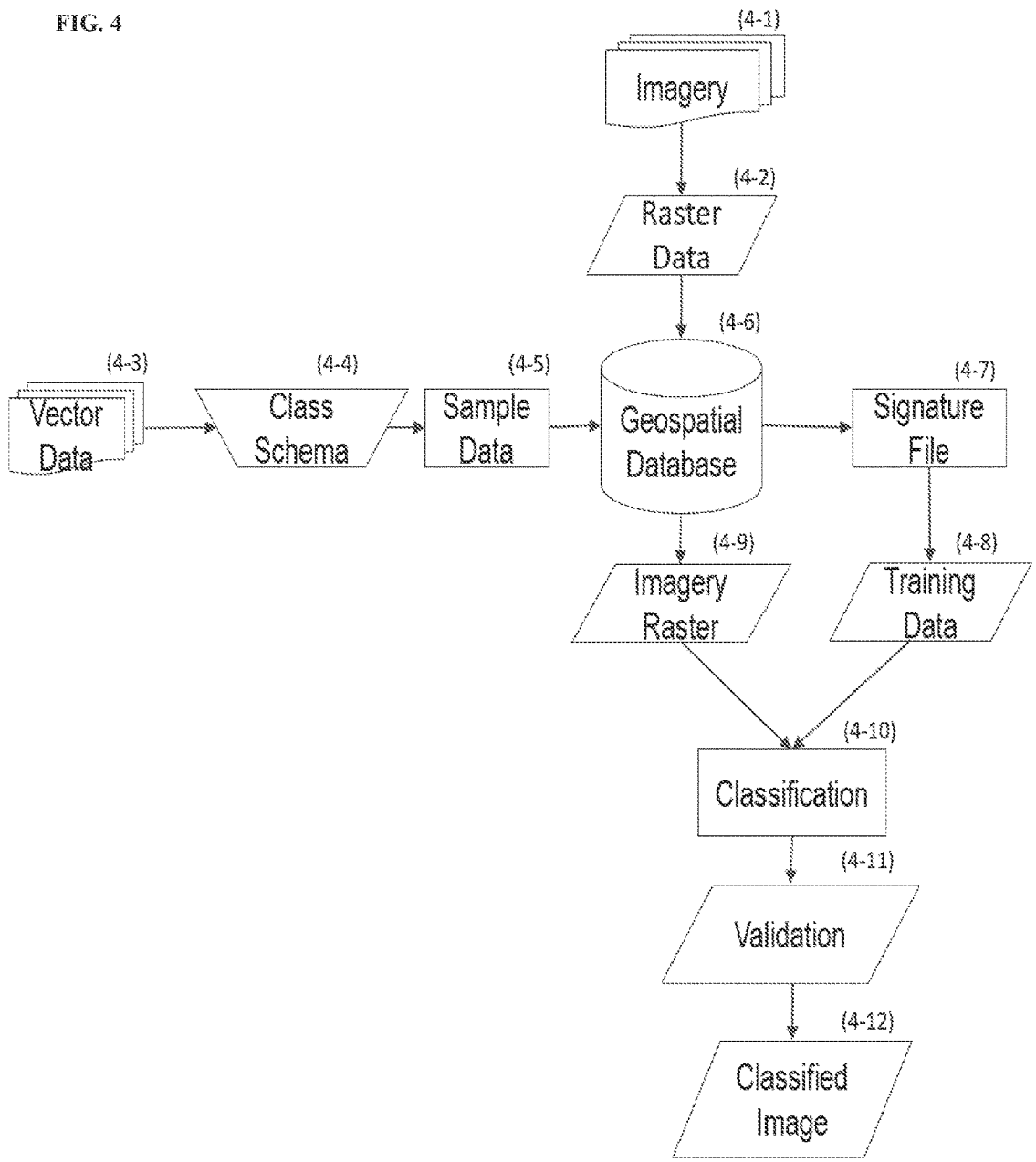

FIG. 4 illustrates schematically, in the form of a flow chart, an embodiment of the method according to the present invention. The method comprises the steps:
  (4-1) receiving one or more image(s) that encompass the desired geographical area to conduct the classification technique,
  (4-2) optionally converting the one or more received image(s) in a raster format in case the one or more image(s) were not provided in a raster format,
  (4-3) receiving vector data for the same geographical area to conduct the classification technique
  (4-4) receiving classification types to be used for the analysis; some examples of classification types (but not limited to): cheatgrass, sagebrush, deciduous forest, wetland, open water, etc.
  (4-5) determining and/or receiving sample data that defines the geographical boundaries for each of the classification layers in (4-4); this data is typically defined from field validation but can be also derived from a desktop analysis, (4-6) feeding data into a geospatial database that is spatially enabled and that houses all data required for the classification methodology; some format types include, but are not limited to, the following: SQL Server, Oracle, Access, ESRI File gdb, mySQL, MongoDB, PostgreSQL, Apache Hive, etc.

(4-7) determining a spectral signature for each classification type (4-4) on the basis of the sample data (4-5)

(4-8) determining updated sample data (4-5) that is used for the classification technique (4-9) determining one or more preprocessed imagery file(s) (raster format) on which the training data. (4-8) will be executed to derive the classification layer (4-10)

(4-10) determining the imagery layer that is classified into specific classification schemes (4-4)

(4-11) validating on the classification layer to ensure the accuracy of the results (4-12) generating the final classification layer on which one or more weed species (such as winter invasive grass types) are identified.

Figure 5:
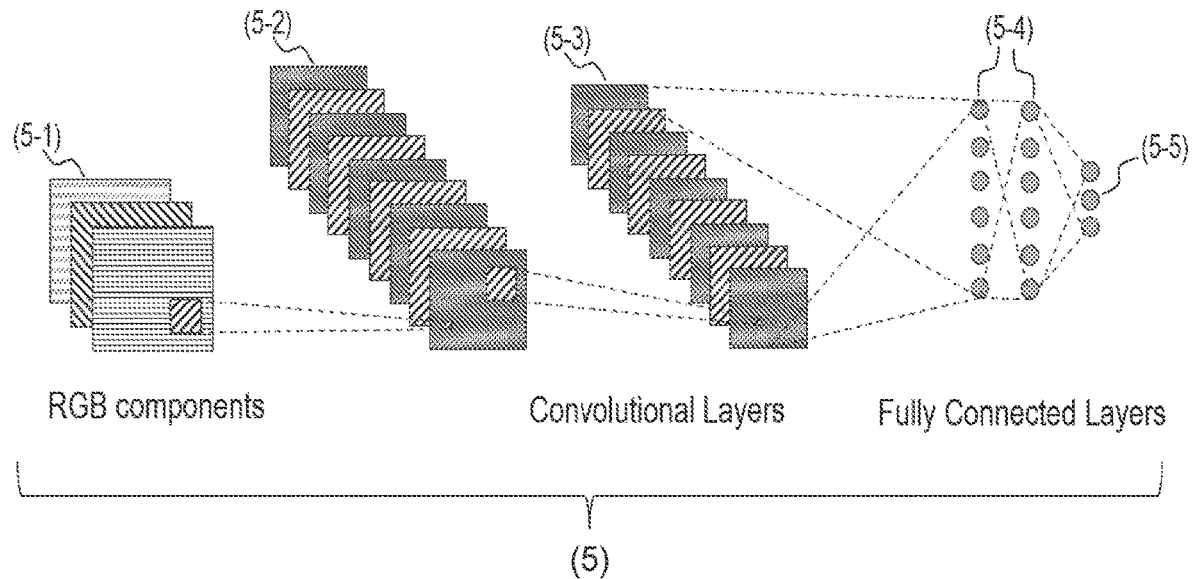
Figure 6:
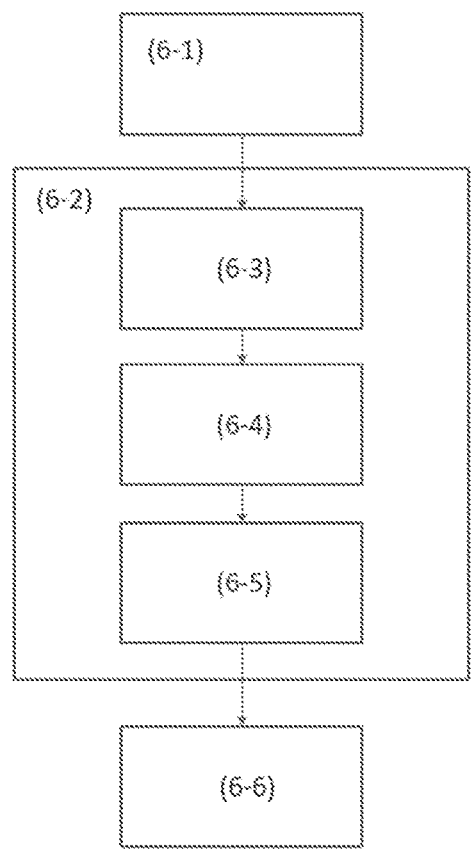

FIGS. 5 and 6 illustrate schematically an exemplary convolutional neural network (5) according to embodiments of the present invention. FIG. 5 illustrates various layers within a CNN. As shown in FIG. 5, an exemplary CNN can receive input (5-1) describing the red, green, and blue (RGB) components of an image. The input (5-1) can be processed by multiple convolutional layers convolutional layer (5-2), convolutional layer (5-3)). The output from the multiple convolutional layers may optionally be processed by a set of fully connected layers (5-4). Neurons in a fully connected layer have full connections to all activations in the previous layer. The output (5-5) from the fully connected layers (5-4) can be used to generate an output result from the network.

The activations within the fully connected layers (5-4) can be computed using matrix multiplication instead of convolution.

The convolutional layers (5-2, 5-3) are sparsely connected, which differs from traditional neural network configuration found in the fully connected layers (5-4). Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to process large images.

FIG. 6 illustrates exemplary computation stages within a convolutional layer of a CNN. Input (6-1) to a convolutional layer (6-2) of a CNN can be processed in three stages of the convolutional layer (6-2). The three stages can include a convolution stage (6-3), a detector stage (6-4), and a pooling stage (6-6). The convolution layer (6-2) can then output data to a successive convolutional layer. The final convolutional layer of the network can generate output feature map data or provide input to a fully connected layer, for example, to generate a. classification or regression value.

In the convolution stage (6-3), the convolutional layer (6-2) can perform several convolutions in parallel to produce a set of linear activations. The convolution stage (6-3) can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage (6-3) defines a set of linear activations that are processed by successive stages of the convolutional layer (6-2).

The linear activations can be processed by a detector stage (6-4). In the detector stage (6-4), each linear activation is processed by a non-linear activation function. The non-linear activation function increases the non-linear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is threshold at zero.

The pooling stage (6-5) uses a pooling function that replaces the output of the convolutional layer with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage (6-5), including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer (6-2) can then be processed by the next layer (6-6). The next layer (6-6) can be an additional convolutional layer or one of the fully connected layers (5-4 in FIG. 5). For example, the first convolutional layer (5-2) of FIG. 5 can output to the second convolutional layer (5-3), while the second convolutional layer can output to a first layer of the fully connected layers (5-4).

Figure 7:
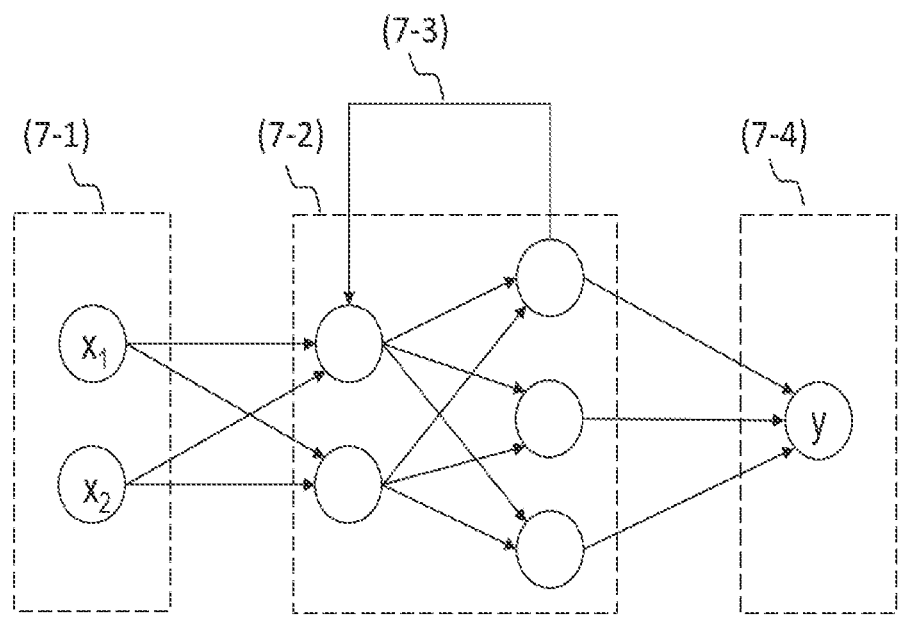

FIG. 7 illustrates an exemplary recurrent neural network according to an embodiment of the present invention. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. The illustrated RNN can be described has having an input layer (7-1) that receives an input vector, hidden layers (7-2) to implement a recurrent function, a feedback mechanism (7-3) to enable a 'memory' of previous states, and an output layer (7-4) to output a result. The RNN operates based on time-steps.

The state of the RNN at a given time step is influenced based on the previous time step via, the feedback mechanism (7-3). For a. given time step, the state of the hidden layers (7-2) is defined by the previous state and the input at the current time step. An initial input ($x_1$) at a first time step can be processed by the hidden layer (7-2). A second input ($x_2$) can be processed by the hidden layer (7-2) using state information that is determined during the processing of the initial input ($x_1$), A given state can be computed as $s_t=f(Ux_1+Ws_{t-1})$, where U and W are parameter matrices. The function f is generally a nonlinearity, such as the hyperbolic tangent function (tanh) or a variant of the rectifier function $f(x)=\max(0, x)$. However, the specific mathematical function used in the hidden layers (7-2) can vary depending on the specific implementation details of the RNN.

Figure 8:
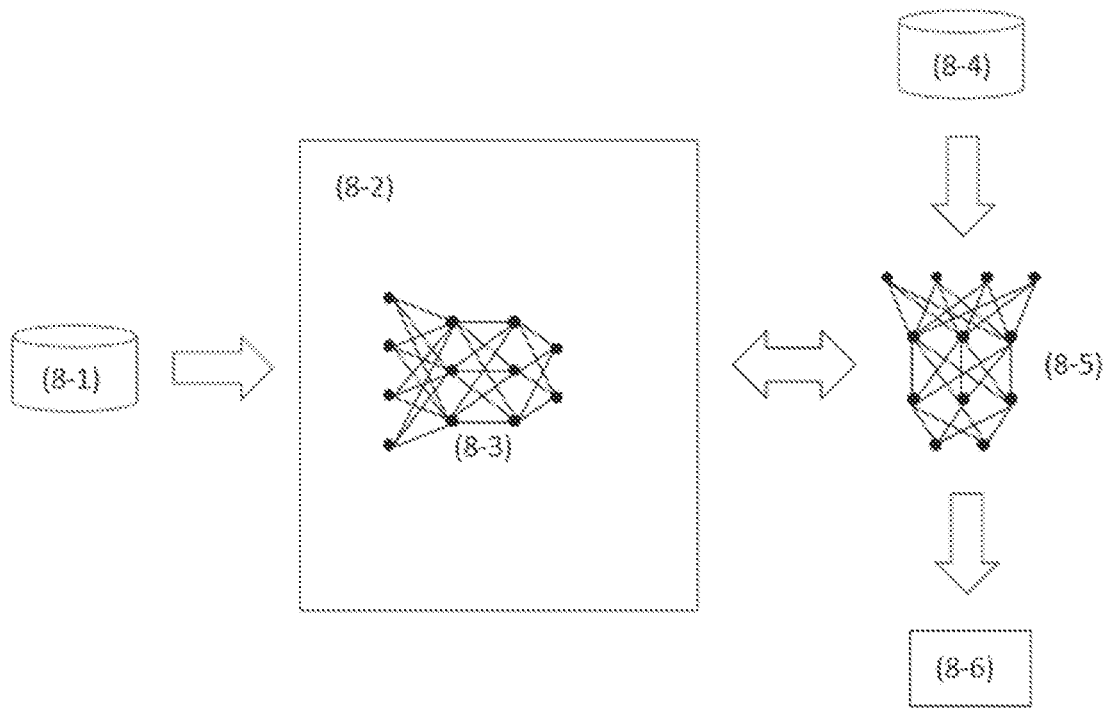

FIG. 8 illustrates an exemplary training and deployment of an artificial neural network according to an embodiment of the present invention. Once a given network has been structured for a task the neural network is trained using a training dataset (8-1).

To start the training process the initial weights may be chosen randomly or by pre-training e.g., using a deep belief network. The training cycle then be performed in either a supervised or unsupervised manner. Supervised learning is a learning method in which training is performed as a mediated operation, such as when the training dataset (8-1) includes input paired with the desired output for the input, or where the training dataset includes input having known output and the output of the neural network is manually graded. The network processes the inputs and compares the resulting outputs against a set of expected or desired outputs. Errors are then propagated back through the system. The training framework (8-2) can adjust the weights that control the untrained neural network (8-3). The training framework (8-2) can provide tools to monitor how well the untrained neural network (8-3) is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network (8-5). The trained neural network (8-5) can then be deployed to implement any number of machine learning operations, A new dataset (8-4) comprising one or more image(s) of e.g. a new geographical area (8-4) can be inputted into the trained neural network (8-5) to determine an output result (8-6), the output result (8-6) comprising the information whether there are one or more areas in the image(s) which show geographical subareas, the geographical subarea being infested by a specific weed.

Having described the present disclosure in detail, it will be apparent that modifications, variations, and equivalent aspects are possible without departing from the spirit and scope of the present disclosure as described herein and in the appended figures and claims, Furthermore, it should be appreciated that all examples and embodiments in the present disclosure are provided as non-limiting examples.

What is claimed is:

1. A computer system, the computer system comprising:
a receiving unit;
a processing unit; and
an output unit;
wherein the receiving unit is configured to provide the processing unit with at least two images of a geographical area, wherein the images display the geographical area at two or more points in time during a phenological cycle of a weed, including a first point in time and a second point in time, the first point in time being a time point at which the weed is at a first phenological stage and the second point in time being a time point at which the weed is at a second phenological stage;
wherein the processing unit is configured to analyze the images to identify one or more image area(s) in the images the image area(s) showing a spectral signature, wherein the spectral signature is characteristic of the weed at the two or more points in time during the phenological cycle of the weed, and wherein the spectral signature is caused by a transition of the weed from the first phenological stage into the second phenological stage;
wherein the processing unit is configured to identify one or more geographical subarea(s) corresponding to the identified image area(s);
wherein the processing unit is configured to create a weed distribution map of the geographical area on which the identified geographical subarea(s) is/are marked as (an) area(s) affected by the weed; and
wherein the output unit is configured to output the map.

2. The computer system according to claim 1, wherein the weed is a grass weed.

3. The computer system according to claim 1, wherein the weed is downy brome being in the phenological stage in which the color of the weed is purple, or the weed is ventenata being in the phenological stage in which the color of the weed is white with a silvery sheen, or the weed is medusahead being in the phenological stage in which the weed is strawcolored.

4. The computer system according to claim 1, wherein the weed is downy brome changing its color from green to purple or from purple to straw-color, or the weed is ventenata changing its color from green to white with a silvery sheen, or the weed is medusahead changing its color from green to straw-color.

5. The computer system according to claim 1, wherein the processing unit is configured to feed the at least two images into a classifier, and to receive, as an output from the classifier, information about one or more subareas showing the one or more graphical subareas infested by the weed.

6. The computer system according to claim 1, wherein the processing unit is configured to feed the at least two images into an-artificial neural network, and to receive, as an output from the artificial neural network, information about one or more subareas showing the one or more graphical subareas infested by the weed.

7. The computer system according to claim 6, wherein the artificial neural network comprises convolutional layers and feedback cycles.

8. The computer system according to claim 1, wherein the processing unit is configured to determine a degree of infestation of the identified geographical subarea.

9. The computer system according to claim 1 wherein the processing unit is configured to determine a criticality score for the identified geographical subarea, the criticality score being representative of a risk of a fire outbreak caused by the identified geographical subarea.

10. The computer system according to claim 1, wherein the processing unit is configured to determine a criticality score for the identified geographical subarea, the criticality score being representative of a potential amount of damages caused by the identified geographical subarea.

11. The computer system according to claim 1, wherein the processing unit is configured to calculate a cost for treating the identified geographical subarea with a herbicide.

12. The computer system according to claim 1, wherein the processing unit is configured to generate a prescription map on the basis of the weed distribution map, wherein the prescription map displays areas to be treated with a herbicide.

13. The computer system according to claim 12, wherein the areas to be treated are selected on the basis of a criticality score and/or a cost for treating.

14. A system for controlling weed, the system comprising;
an image acquisition unit, wherein the image acquisition unit is configured to collect at least two while the image acquisition unit is moved relative to a geographical area, wherein the images display the geographical area at two or more points in time during a phenological cycle of a weed, including a first point in time and a second point in time, the first point in time being a time point at which the weed is at a first phenological stage and the second point in time being a time point at which the weed is at a second phenological stage;
a spraying unit, comprising a receptable containing a herbicide for controlling a weed;
locomotion means for moving the image acquisition unit and the spraying unit relative to the geographical area; and
a processing unit configured to:
receive the at least two images from the image acquisition unit;
analyze the received and identify one or more areas in the images based on a spectral signature, the area(s) in the images showing geographical subareas, the geographical subareas being infested by the weed, wherein the spectral signature is characteristic of the weed at the two or more points in time during the phenological cycle of the weed, and wherein the spectral signature is caused by a transition of the weed from the first phenological stage into the second phenological stage; and
cause the spraying unit to apply the herbicide to the geographical subareas.

15. A method for mapping a weed, the method comprising:
receiving at least two images of a geographical area, wherein the images display the geographical area at two or more points in time during a phenological cycle of a weed, including a first point in time and a second point in time, the first point in time being a time point at which the weed is at a first phenological stage and the second point in time being a time point at which the weed is at a second phenological stage;
analyzing the at least two and identifying one or more image area(s) in the at least two images, the image area(s) showing a spectral signature, wherein the spectral signature is characteristic of the weed at the two or more points in time during the phenological cycle of the weed, and wherein the spectral signature is caused by a transition of the weed from the first phenological stage into the second phenological stage;
identifying one or more geographical subareas, the geographical subarea(s) corresponding to the identified image area(s);
creating a weed distribution map of the geographical area on which the identified geographical subarea(s) is/are marked as (an) area(s) affected by the weed;
displaying the weed distribution map on a monitor and/or storing the map in a data storage and/or transmitting the map to a separate computer system.

* * * * *